United States Patent [19]

Judson

[11] Patent Number: 4,498,446

[45] Date of Patent: Feb. 12, 1985

[54] DIESEL FUEL HEATER

[76] Inventor: Daniel G. Judson, P.O. Box 417, Lisbon, Me. 04250

[21] Appl. No.: 508,821

[22] Filed: Jun. 29, 1983

[51] Int. Cl.³ .............................................. F02M 31/00
[52] U.S. Cl. ................................... 123/557; 210/184; 165/46
[58] Field of Search ..................... 123/557, 196 AB; 165/46; 210/186, 184, 185

[56] References Cited

U.S. PATENT DOCUMENTS

| | | | |
|---|---|---|---|
| 2,218,715 | 10/1940 | McCormack | 210/186 |
| 2,331,482 | 10/1943 | Lamb | 210/186 |
| 2,346,042 | 4/1944 | Morris | 210/184 |
| 2,572,320 | 10/1951 | Cox | 165/46 |
| 3,443,060 | 5/1969 | Smith | 165/46 |
| 4,019,020 | 4/1977 | Bilbee | 165/46 |
| 4,091,265 | 5/1978 | Richards | 123/557 |
| 4,368,716 | 1/1983 | Davis | 123/557 |
| 4,372,260 | 2/1983 | Baker | 210/184 |
| 4,387,691 | 6/1983 | Marcoux | 123/557 |
| 4,442,819 | 4/1984 | Veach | 123/557 |

FOREIGN PATENT DOCUMENTS 2107782  5/1983  United Kingdom ................ 123/557

Primary Examiner—Ronald H. Lazarus
Attorney, Agent, or Firm—Daniel H. Kane, Jr.

[57] ABSTRACT

A diesel fuel heater is provided in the general form of a flexible elongate fluid jacket having sufficient length for wrapping around the diesel fuel filter of a diesel engine. The flexible elongate fluid jacket defines a channel having an inlet and outlet for operatively coupling into the liquid coolant circulating system of the diesel engine. The fluid jacket transfers heat from the circulating liquid coolant to diesel fuel passing through the fuel filter. Furthermore, the fluid jacket and channel are distributed and arranged to cover substantially the entire surface of the circumference of the diesel fuel filter thereby insulating the diesel fuel filter from cold air while maximizing heat transfer. In a preferred example the channel defined by the fluid jacket is in the configuration of an elongate "U" shape in which the legs of the "U" may be wrapped around the circumference of the diesel fuel filter as a single unit.

8 Claims, 4 Drawing Figures

DIESEL FUEL HEATER

TECHNICAL FIELD

This invention relates to a new diesel fuel heater for heating the fuel at the diesel fuel filter while insulating the filter from cold air. The invention promotes filterability and combustion efficiency of the fuel and is easily removable and replaceable according to weather temperature conditions, and for regular scheduled changes of the diesel fuel filter.

BACKGROUND ART

The combustion of diesel fuel in internal combustion diesel engines is accompanied by problems accentuated at cold temperatures associated with the special characteristics of the diesel fuel. At very cold temperatures the wax constituents of diesel fuel tend to congeal and water and other contaminants may crystallize particularly in the diesel fuel filter which presents extended surface areas to cold air. The diesel engine may therefore stall or refuse to start as a result of a clogged fuel filter or other fuel passageway. Furthermore, the interference in effiency of combustion by water and other contaminants in the diesel fuel increases with lower temperatures.

As a result of these problems of loss of power, stalling, and failure to start associated with diesel engines in cold weather, a variety of "in-line" diesel fuel heaters have been developed and are available on the market for heating diesel fuel before it passes to the diesel fuel filter. Such heaters generally comprise a separate appliance or piece of equipment permanently installed with some difficulty in a crowded engine compartment and may require intervention with special modifications, fittings and connectors in the fuel line itself. Each intervention or connection in the fuel line presents another vulnerable source of contamination, leakage, or air in the fuel system. For example, the Davis U.S. Pat. No. 4,368,716 and the Wagner U.S. Pat. No. 4,349,001 illustrate examples in which a separate fuel preheater and processor is introduced into the diesel fuel line at a different location from the fuel filter.

The closest prior art of which applicant is aware consists of the Baker U.S. Pat. No. 4,372,260, the Dushane U.S. Pat. No. 2,348,247, and the Lamb U.S. Pat. No. 2,331,482, all of which describe oil and fuel preheaters in the form of a hot water jacket formed or installed in the vicinity of the fuel filter although not directly around the filter. In each case the hot water jacket constitutes a rigid piece of hardware which is permanently mounted and installed adjacent to the fuel filter. Such examples require permanent installation of hardware equipment and do not themselves protect the extended surface areas of the fuel filter from cold air.

OBJECTS OF THE INVENTION

It is therefore an object of the present invention to provide a new diesel fuel filter which heats the fuel in the fuel filter itself while insulating the fuel filter from exposure to cold air.

Another object of the invention is to provide a removable and replaceable fuel heater which may be readily placed or installed around the fuel filter in cold weather and which uses the heat of the engine coolant for heating the fuel and promoting filterability and combustion efficiency.

A further object of the invention is to provide a diesel fuel filter applicable for cold weather operation which is not permanently installed and does not require special hardware and fittings.

DISCLOSURE OF THE INVENTION

In order to accomplish these results, the present invention provides a diesel fuel heater in the general form of a flexible elongate fluid jacket having sufficient length for wrapping around the diesel fuel filter of a diesel engine. The flexible elongate fluid jacket defines a channel having an inlet and outlet for operatively coupling into the liquid coolant circulating system of the diesel engine for preheating diesel fuel at the filter by transferring heat from the circulating liquid coolant to diesel fuel passing through the fuel filter. In the preferred example the channel defined by the flexible elongate fluid jacket is distributed and arranged to cover substantially the entire surface of the circumference of the diesel fuel filter thereby insulating the diesel fuel filter from cold air while maximizing heat transfer from the circulating liquid coolant.

According to one example the channel defined by the fluid jacket is in the configuration of an elongate "U" shape in which the legs of the "U" may be wrapped around the circumference of the diesel fuel filter as a single unit. The inlet and outlet couplings are located adjacent to each other at the ends of the respective legs of the "U" shape channels for circulating the liquid coolant over substantially the entire shape of the circumference of the diesel fuel filter.

The flexible elongate fluid jacket may be formed from extruded tubing or from layers of flexible plastic material with the tubular channel sealed between the layers. A variety of mating couplings may be used at the ends of the fluid jacket or other securing arrangements may be provided for retaining the fluid jacket in operative position around a diesel fuel filter.

Other objects, features and advantages will be apparent in the following specification and accompanying claims.

BRIEF DESCRIPTION OF DRAWINGS

FIG. 1 is a plan view of the flexible elongate fluid jacket of a diesel fuel heater according to the present invention, while

DESCRIPTION OF PREFERRED EXAMPLE EMBODIMENTS AND BEST MODE OF THE INVENTION

Figure 1:
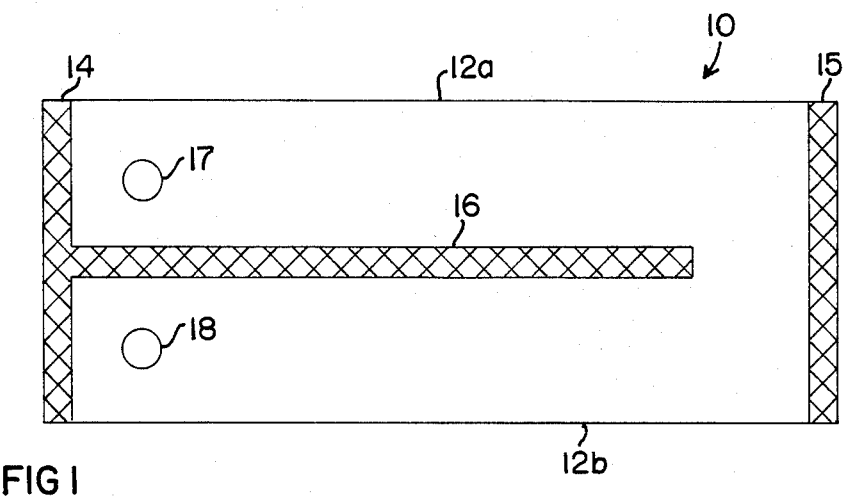
Figure 1A:
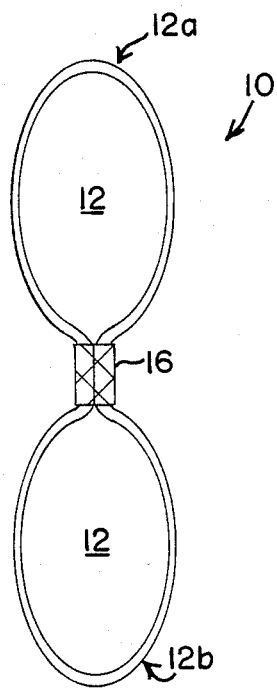
FIG. 1A is a cross sectional view of the fluid jacket in the direction of the arrows on line AA of FIG. 1.
Figure 2:
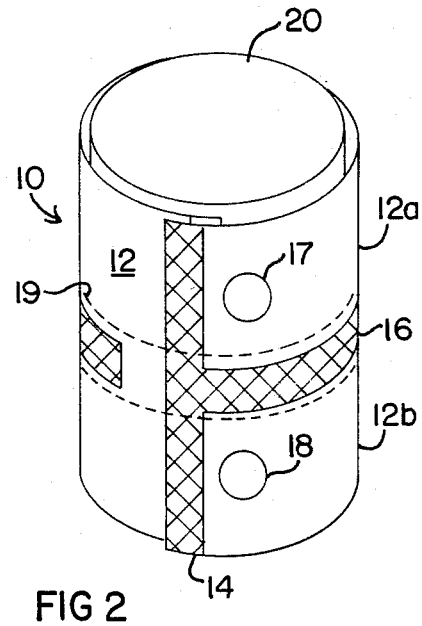
FIG. 2 is a perspective view of the flexible elongate fluid jacket of FIG. 1 in operative position secured around the circumference of a diesel fuel filter.

A flexible fluid circulating jacket 10 for use as a diesel fuel heater according to the present invention is illustrated in FIGS. 1, 1A and 2. The sheath or skin of the water jacket defines a "U" shaped channel 12 lying horizontally with an upper leg 12a and a lower leg 12b. The fluid circulating jacket 10 may be formed of a double layer, that is inner and outer layers of a flexible plastic material such as Neoprene synthetic rubber compatible with the high temperatures of the circulating coolant which may be in the order, for example, at the upper limit of 200° to 250° F. A continuous inner and outer layer is achieved by forming the fluid jacket from an extruded tube of Neoprene so that there are no seams along the outer edges of the legs 12a and 12b.

A length of extruded tubing of the flexible plastic material typically, for example, 14 inches (35.6 cm) in length is sealed at each end with sealing seams 14 and 15 respectively as is well known. The sealing seams 14 and 15 may also serve as flange tabs at the ends of the fluid jacket for supporting mating couplings or mating surfaces for joining and securing the ends of the fluid jacket to each other around a diesel fuel filter as illustrated in FIG. 2. The extruded length of tubing is also formed with a central sealing seam 16 extending from one end of the elongate fluid jacket, namely from sealing seam 14 most of the way along the center of the tube. The center seam 16 separates the upper leg 12a of the rubber "U" shape channel from the lower leg 12b. The other end of the "U" shape channel 12, that is the end adjacent to seam 15, remains open for the circulation of fluid, for example, from the upper leg 12a to the lower leg 12b through the inlet 17 and outlet 18 formed in the ends of the respective legs 12a and 12b adjacent to the end seam 14.

The fluid jacket is typically 3.5 inches (8.8 cm) to 5.5 inches (13.8 cm) in width and 14 inches (35.6 cm) to 16 inches (40.6 cm) in length according to standard size and diameter diesel fuel filters. Heavy duty Neoprene plastic or synthetic rubber, for example ⅛ inches (0.32 cm) in thickness gauge, is used for the extruded synthetic plastic tube.

The elongate flexible water jacket 10 is shown in operative position secured around a diesel fuel filter 20 in FIG. 2. The end seams 14 and 15 provide overlapping flange tabs for securing the ends of the jacket around the fuel filter. The flange tabs or end seams 14 and 15 may be provided, for example, with snaps, hooks, clips or Velcro(Trademark) strips for securing the end flange tabs to each other thereby securing the elongate fluid jacket around the fuel filter 20. The overall length of the fluid jacket may be adjustable by extending the width of the end seams or end flange tabs 14 and 15 to provide variable overlapping. In this manner the extent of overlap can be varied to adapt the fuel heater fluid jacket to diesel fuel filters of different diameters. Alternatively, a belt 19 or circumferential clamp may be used around the outside of the fluid jacket, for example, along the central seam 16 to secure the jacket around diesel fuel filters of differing diameters.

Figure 3:
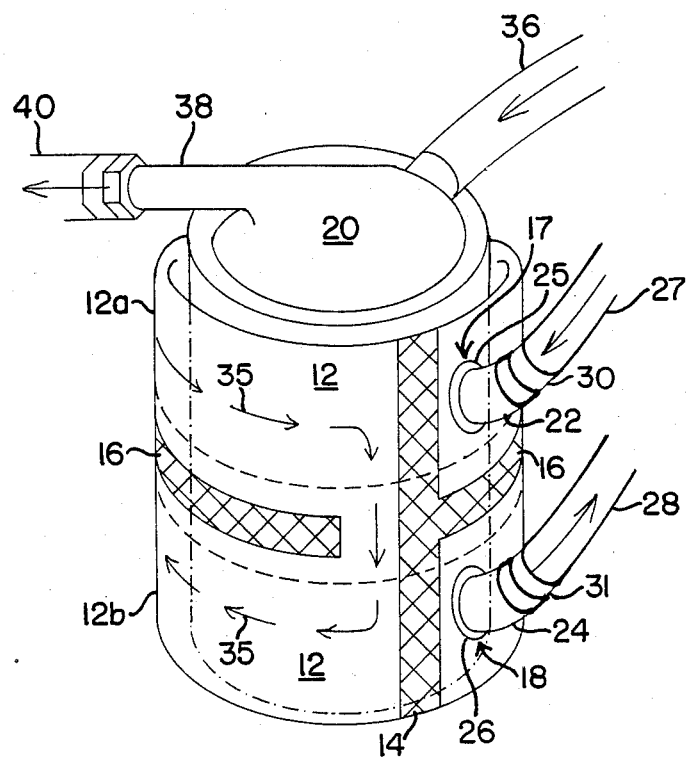
FIG. 3 is a perspective view of the operation of the diesel fuel heater showing the channel defined by the elongate fluid jacket inflated with circulating coolant for transferring heat to the diesel fuel filter.

For operation as a part of the coolant circulating system, the inlet 17 and outlet 18 are fitted with rigid tube inserts 22 and 24 sealed respectively to the inlet 17 and outlet 18 by sealing rims 25 and 26 as shown in FIG. 3. Flexible hoses 27 and 28 are then secured to the tubular inserts 22 and 24 of the fluid jacket using, for example, conventional hose clamps 30 and 31.

In FIG. 3, the elongate fluid jacket of the diesel fuel heater is shown inflated by the circulating coolant of the diesel engine entering through the engine coolant inlet hose 27 and exiting through the engine coolant hose 28 respectively secured to the rigid inserts 22 and 24. Inside the fluid jacket, the coolant circulates through the "U" shape channel in one direction along the leg 12a and returning in the opposite direction along the leg 12b as indicated by the diagrammatic circulation arrows 35. While the high temperature liquid coolant circulates through the "U" shape channel 12 from inlet hose 27 to outlet hose 28, the diesel fuel itself passes through the extended surface area of diesel fuel filter 20 entering through diesel fuel supply hose 36 from the fuel tank and exiting through diesel filter outlet 38. The diesel fuel filter is drawn or pumped by a fuel pump through the manifold 40. Heat is thus transferred or exchanged from the higher temperature circulating coolant liquid to the lower temperature diesel fuel over the surfaces of fuel filter 20. The higher temperature maintains the desirable flow characteristics of the diesel fuel, facilitates filtering of contaminants in the fuel filter 20, and maintains the characteristics of the diesel fuel in the optimum range of combustion efficiency. At the same time, the elongate fluid jacket of generally flat rectangular configuration covers the entire circumferential surface or outer surface of the fuel filter cylinder insulating the fuel filter from cold air and low temperature wind particularly during driving at high speed. In fact, it is apparent that the "U" shape channel itself covers substantially the entire circumference or outer surface of the fuel filter for maximum contact and maximum exchange of heat from the circulating coolant at all the outer surfaces of the fuel filter.

While the invention has been described with reference to the preheating or heating of diesel fuel at the fuel filter, it is apparent that it is applicable also for preheating other types of fuels such as, for example, at a fuel filter or for exchanging heat from one circulating liquid to another liquid or material in a cylinder or similar enclosure in which a second fluid is circulating. Thus, the fluid jacket of the present invention bears some resemblance to an elongate water bottle, however, of unique configuration and with the added capability of circulation and replacement of the heating fluid. Thus, while the invention is described with reference to particular example environments and embodiments, it is intended to cover all modifications and equivalents within the scope of the following claims.

I claim:

1. A diesel fuel heater for preheating diesel fuel at a diesel fuel filter in diesel powered vehicles having a diesel engine cooled by a liquid coolant circulating system comprising:

flexible elongate fluid jacket means having sufficient length for wrapping around the diesel fuel filter of the diesel engine, said flexible elongate fluid jacket means defining a channel having inlet means and outlet means for operatively coupling into the liquid coolant circulating system of the diesel engine, thereby preheating diesel fuel at the filter by transferring heat from the circulating liquid coolant to diesel fuel passing through the diesel fuel filter;

said channel defined by the flexible elongate fluid jacket means being distributed and arranged to cover substantially the entire surface of the circumference of the diesel fuel filter thereby insulating and protecting the diesel fuel filter from cold air wind during operation of the vehicle;

and means for removable and replaceably securing said flexible elongate fluid jacket means in operative position around a diesel fuel filter for rapid placement of the flexible elongate fluid jacket means around the diesel fuel filter during cold weather by an operator of the diesel powered vehicle.

2. The heater of claim 1 wherein the channel defined by the elongate fluid jacket means is in the configuration of an elongate "U" shape in which the legs of the "U" may be wrapped around the circumference of the diesel fuel filter and wherein the inlet means and outlet means are located adjacent to each other at the ends of the respective legs of the "U" shape channels.

3. The heater of claim 1 wherein the flexible elongate fluid jacket means is comprised of flexible plastic material and wherein said channel comprises a tubular channel extruded from the flexible plastic material.

4. The apparatus of claim 1 wherein the means for removably and replaceably securing the flexible elongate fluid jacket means in operative position around the diesel fuel filter comprises belt means.

5. The heater of claim 1 wherein the flexible elongate fluid jacket means is formed at the ends with respective mating coupling surfaces for removably and replaceably securing the fluid jacket in operative position around a diesel fuel filter.

6. A diesel fuel heater for preheating diesel fuel at a diesel fuel filter in diesel powered vehicles having a diesel engine cooled by a liquid coolant circulating system comprising:

flexible elongate fluid jacket means having sufficient length for wrapping around the diesel fuel filter of the diesel engine, said flexible elongate fluid jacket means defining at least one "U" shape channel with elongate legs oriented so that the legs of the "U" shape channel may wrap around the circumference of the fuel filter, said "U" shape channel having inlet means and outlet means operatively positioned adjacent to each other at the ends of the respective legs of the "U" shape channel, said inlet means and outlet means constructed and arranged for operative coupling into the liquid coolant circulating system of the diesel engine thereby circulating liquid coolant through the "U" shape channel and preheating diesel fuel at the diesel fuel filter by transferring heat from the circulating liquid coolant;

said flexible elongate fluid jacket means comprising an elongate tube formed with end seams closing the ends of the tube in a flat configuration, and a center seam extending from one end seam along a major portion of the length of the elongate tube but terminating before the other end seam to define the "U" shaped channel, said elongate tube being formed without seams along the elongate outer sides;

said flexible elongate fluid jacket means "U" shape channel distributed and arranged for covering substantially the entire surface of the circumference of the diesel fuel filter thereby insulating and protecting the diesel fuel filter from cold air wind during operation of the vehicle;

and means for removably and replaceably securing said flexible elongate fluid jacket means in operative position around the diesel fuel filter for rapid placement of the fluid jacket operator of the diesel powered vehicle during periods of cold air temperature weather and for rapid removal by the operator when no longer needed.

7. The heater of claim 6 wherein the flexible elongate fluid jacket is formed at each end with a flat flange tab extending the width of the jacket for overlapping of the flange tabs and wherein the flange tabs are formed with mating coupling surfaces for removably and replaceably securing the flexible elongate fluid jacket in operative position.

8. The heater of claim 6 wherein said flexible elongate fluid jacket means including the "U" shape channel is formed in a substantially flat elongate rectangular configuration for coaxially enclosing the cylindrical diesel fuel filter.

* * * * *